(12) United States Patent
Lehmann et al.

(10) Patent No.: US 11,717,879 B2
(45) Date of Patent: Aug. 8, 2023

(54) USE OF CLOSED-PORE MICROSPHERES OF EXPANDED PEARLITE AS A FILLER FOR THE PRODUCTION OF MOULDINGS FOR THE FOUNDRY INDUSTRY

(71) Applicant: HÜTTENES-ALBERTUS CHEMISCHE WERKE GESELLSCHAFT MIT BESCHRÄNKTER HAFTUNG, Düsseldorf (DE)

(72) Inventors: Sandra Lehmann, Potsdam (DE); Klaus Riemann, Wunstorf (DE); Nils Zimmer, Garbsen (DE); Hermann Lieber, Langenhagen (DE); Jürgen Hübert, Langenhagen (DE)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 561 days.

(21) Appl. No.: 16/092,115

(22) PCT Filed: Apr. 10, 2017

(86) PCT No.: PCT/EP2017/058584
§ 371 (c)(1),
(2) Date: Oct. 8, 2018

(87) PCT Pub. No.: WO2017/174826
PCT Pub. Date: Oct. 12, 2017

(65) Prior Publication Data
US 2019/0118244 A1    Apr. 25, 2019

(30) Foreign Application Priority Data
Apr. 8, 2016   (DE) .................... 10 2016 205 960.2

(51) Int. Cl.
B22C 1/16         (2006.01)
B22C 1/22         (2006.01)
(Continued)

(52) U.S. Cl.
CPC ................ B22C 1/167 (2013.01); B22C 1/02 (2013.01); B22C 1/183 (2013.01); B22C 1/2253 (2013.01);
(Continued)

(58) Field of Classification Search
CPC .......... B22C 1/02; B22C 1/167; B22C 1/183; B22C 1/2253; B22C 1/2273; B22C 9/088;
(Continued)

(56) References Cited

U.S. PATENT DOCUMENTS 3,961,978 A    6/1976  Brodmann
4,138,268 A *  2/1979  Vogel .................... F16L 59/024
                                               106/605

(Continued)

FOREIGN PATENT DOCUMENTS

CN    104841848    8/2015
CN    105414468    3/2016

(Continued)

OTHER PUBLICATIONS

Pilato, "Phenolic Resins: A Century of Progress", Springer-Verlag Berlin Heidelberg, 2010.
(Continued)

*Primary Examiner* — Shuangyi Abu Ali
(74) *Attorney, Agent, or Firm* — Duane Morris LLP; Gregory M. Lefkowitz; Brandon A. Chan (57) ABSTRACT

The present invention relates to the use of closed-pore microspheres of expanded perlite as a filler for producing moldings for the foundry industry, to a composition for producing moldings for the foundry industry, comprising
(Continued)

closed-pore microspheres of expanded perlite as a filler, and a binder, the binder being selected from the group consisting of water glass, phenol-formaldehyde resins, two-component systems comprising as reactants a polyisocyanate and a polyol component containing free hydroxyl groups (OH groups), and starch, and also to moldings for the foundry industry and to a process for producing a molding for the foundry industry.

10 Claims, 1 Drawing Sheet

(51) Int. Cl.
| | |
|---|---|
| *B22C 1/18* | (2006.01) |
| *B22C 1/02* | (2006.01) |
| *B22C 9/08* | (2006.01) |
| *C04B 35/634* | (2006.01) |
| *C04B 35/63* | (2006.01) |
| *C04B 38/08* | (2006.01) |
| *C04B 38/00* | (2006.01) |

(52) U.S. Cl.
CPC ............ *B22C 1/2273* (2013.01); *B22C 9/088* (2013.01); *C04B 35/6303* (2013.01); *C04B 35/63404* (2013.01); *C04B 35/63476* (2013.01); *C04B 38/0061* (2013.01); *C04B 38/085* (2013.01); *C04B 2235/3427* (2013.01)

(58) Field of Classification Search
CPC ........ C04B 2235/3427; C04B 35/6303; C04B 35/63404; C04B 35/63476; C04B 38/0061; C04B 38/085
See application file for complete search history.

(56) References Cited

U.S. PATENT DOCUMENTS

| | | | |
|---|---|---|---|
| 4,183,980 | A | 1/1980 | Nielsen |
| 4,201,606 | A | 5/1980 | Neat |
| 4,255,489 | A | 3/1981 | Nielsen |
| 2003/0032701 | A1 | 2/2003 | Gough |
| 2009/0169848 | A1* | 7/2009 | Komiyama ............ C04B 35/195 428/315.7 |
| 2012/0326072 | A1 | 12/2012 | Baek |
| 2013/0037375 | A1 | 2/2013 | Salazar et al. |
| 2014/0291582 | A1* | 10/2014 | Brunnmair ................ F27B 1/22 252/378 R |
| 2016/0244375 | A1* | 8/2016 | Maier ...................... C04B 28/04 |

FOREIGN PATENT DOCUMENTS

| | | |
|---|---|---|
| DE | 2121353 | 11/1972 |
| DE | 102011079692 | 1/2013 |
| EP | 0771599 | 5/1997 |
| EP | 1057554 | 12/2000 |
| EP | 1184104 | 3/2002 |
| EP | 1728571 | 12/2006 |
| JP | S48-7573 | 1/1973 |
| JP | S50123525 | 9/1975 |
| JP | 2000288685 | 10/2000 |
| JP | 2014129187 | 7/2014 |
| WO | 84/03460 | 9/1984 |
| WO | 2006/097278 | 9/2006 |
| WO | 2008/006602 | 1/2008 |
| WO | 2013/053635 | 4/2013 |
| WO | WO-2015056139 A2 * | 4/2015 ........... C04B 14/185 |

OTHER PUBLICATIONS

VDG Merkblatt, "Urethane-Cold-Box Process Handling of Input Materials, Gases And Vapors As Well As Residues", VDG Association of German Foundry People, Feb. 1998, 6 pages.
"Spherical Closed-Pore Expanded Perlite," Henan Science and Technology Yearbook, Department of Henan Science and Technology, Dec. 31, 1999, vol. 17, p. 334.
Yin Yanhui et al., "Study of Fly Ash and Spherical Unicellular Pearlite for High-Strength, Low Heat-Transfer Refractory Brick and its Application," Coal Ash, Oct. 25, 2004, pp. 27-29.
"Application and Research of Industrial Solid Waste on Development of Building Energy-Saving Insulation Materials," Excellent Proceedings at Annual Meeting of Chinese Society for Environment Science, compiled by Chinese Society for Environment Science, China Environmental Science and Technology, May 31, 2007, vol. 1, pp. 558.
*Henan Science and Technology Yearbook*, vol. 17, Dec. 31, 1999, Department of Henan Science and Technology et al. Spherical Closed-Pore Expanded Perlite, p. 334, 1-28.
*Coal Ash*, Oct. 25, 2004, Yin Yanhui et al. Study of Fly Ash and Spheric Unicellular Pearlite for High-Strength, Low Heat-Transfer Refractory, pp. 27-29, 1-28.
*Excellent Proceedings at Annual Meeting of Chinese Society for Environment Science*, vol. 1, 2007, May 31, 2007, Compiled by Chinese Society for Environment Science et al. Application and Research of Industrial Solid Waste on Development of Building Energy-Saving Insulation Materials, p. 558, 1-28.

* cited by examiner

USE OF CLOSED-PORE MICROSPHERES OF EXPANDED PEARLITE AS A FILLER FOR THE PRODUCTION OF MOULDINGS FOR THE FOUNDRY INDUSTRY

CROSS-REFERENCE TO RELATED APPLICATIONS

This application is a § 371 national stage entry of International Application No. PCT/EP2017/058584, filed on Apr. 10, 2017, which claims priority to German Patent Application No. 10 2016 205 960.2, filed on Apr. 8, 2016, the entire contents of which are incorporated herein by reference.

The present invention relates to the use of closed-pore microspheres of expanded perlite as a filler for producing moldings for the foundry industry, to compositions for producing moldings for the foundry industry, to moldings for the foundry industry, and to a process for producing a molding for the foundry industry.

In the production of shaped metallic parts in the foundry industry, liquid metal is introduced into a casting mold, where it solidifies. The solidification process entails a reduction in the metal volume; generally, therefore, feeders are used in or on the casting mold, in order to compensate the volume deficit on solidification of the casting and so to prevent voids forming in the casting. The feeders are connected to the casting, or to the region of the casting that is at risk, and are commonly located above and/or at the side of the molding cavity.

In terms of the existing compositions for producing feeders for the foundry industry, a distinction is drawn between two main groups:

A. Insulating compounds, i.e., moldable and curable compositions (compounds) for producing heat-insulating feeder surrounds or insulating pads or pockets. The (cured) insulating material first to some extent absorbs heat from the liquid metal during casting from the mold, until a temperature equilibrium comes about; from this point onward, the insulating material protects the liquid casting metal for a certain time against further heat losses. Insulating pockets or feeders formed from insulating compounds therefore delay the onset of solidification and promote the dense feeding of a casting. Insulating compounds generally comprise at least one particulate (granular) filler and a binder.

B. Exothermic feeder heating compounds, i.e., moldable and curable exothermic compositions (compounds) which heat up themselves as a result of an aluminothermal or similar reaction during casting from the mold. From exothermic feeder heating compounds (also called exothermic molding materials) it is possible to produce feeders which are inserted into the mold and, in contact with the melt, are able to generate heat. This delivery of heat occurs by virtue of the aluminothermal or similar conversion reaction in the heating compound. In exceptional cases, the heat that is liberated serves to heat the liquid metal in the feeder, but in any case it serves for (partial) compensation of the heat losses. Where feeders with exothermic heating compounds are used, the metal remains liquid for longer by comparison with feeders based on insulating compounds (see A above). The dense feeding of a casting can therefore be improved and, if desired, smaller feeders can be used, thereby lowering the circulation action and increasing the casting yield. Exothermic feeder heating compounds, however, are much more expensive than insulating compounds. Exothermic feeder heating compounds generally comprise at least one particulate (granular) filler, a binder, a relatively high fraction of an oxidizable metal, an oxidizing agent for the oxidizable metal (e.g., iron oxide and/or manganese oxide, potassium nitrate or sodium nitrate), and also igniters. The oxidizable metal is preferably a base metal. The oxidizable metal more preferably is selected from the group consisting of aluminum, magnesium, calcium, and silicon.

In feeder compounds for producing feeders, and in the feeders themselves that are produced from these compounds, it is general practice, as particulate (granular) fillers, to use lightweight fillers, which are intended to exhibit effective insulation in conjunction with high temperature stability and low weight.

DE 10 2005 025 771 discloses an insulating feeder comprising hollow ceramic spheres, hollow glass spheres with a bulk density of less than 0.3 g/cm$^3$, cured binder, and optionally fiber material. The feeder of DE 10 2005 025 771 optionally comprises further materials, which may be referred to as fillers.

In industrial practice, spheres (particularly those of fly-ash) are frequently employed in feeders. These spheres can be classified into different quality levels, resulting in particular from the Al$_2$O$_3$ content and from the fraction of alkali metals and alkaline-earth metals and also of accompanying elements such as iron. For copper, iron, and steel casting applications in particular, the sphere qualities required in practice are particularly high; such qualities, however, are limited in terms of volume and/or are very expensive, and so there is an ongoing need for alternatives that are available reproducibly.

Known examples of lightweight fillers include expanded glass from Liaver and foamed glass from Poraver, hollow glass spheres of type K20 from Omega, and also open-pore expanded perlites. Perlite is classified in the group of the acidic volcanic rocks, the rhyolites. Perlites consist of glass-like, grain-shell beads of up to pea size with a bulk density of around 900-1000 kg/m$^3$. They contain water, which in an industrial operation in entrained flow for a flame, optionally with introduction of air, oxygen-enriched air or oxygen, evaporates and so leads to the expansion of the perlites. The thermal treatment takes place customarily in the temperature range from around 350° C. up to 1150° C. In the course of this process, the perlites expand by up to twenty times the original volume. The expansion process produces open-pore spherulite structures, and the expanded open-pore perlites have bulk densities of 50 to 500 kg/m$^3$, depending on the particle size. Because of the glasslike base material and the expanded structure, open-pore, expanded perlites exhibit very low thermal conductivities of around 0.05 to 0.09 W/mK. Because of a low bulk density and a low thermal conductivity, open-pore expanded perlite is employed as an insulating material in the building-materials industry, but also in the refractory industry for insulating bricks for use at temperatures of up to 1100° C. Also known is the use of open-pore, expanded perlites in feeders, for example DE2121353A (Baur), WO2006097278A1 (A S Lüngen), and US20030032701A1 (Gough). When a material is described as comprising "expanded perlite", without an explicit description of its porosity, the assumption must be made that the material in question is always expanded open-pore perlite, since until a few years ago this was the only form of expanded perlite.

Described in EP 2 697 181 A1 (date of publication of the application: Feb. 19, 2014), probably for the first time, is a process for the closed-cell expansion of perlite. Paragraphs [0005] and [0006] of the document describe how the perlite furnaces known in the prior art at that time result in open-pore granules. In EP 2 899 174 A2 (filing date Jan. 2, 2015) it is said that the expansion of perlite had been known for years but that existing expansion methods resulted in open-cell, riven perlites (paragraph [0019]).

DE 11 2011 103 297 T5 describes a bushing comprising composite layers that is used as a feeder in a fusional casting process and enables heat losses between their walls and the molding sand to be reduced. Fillers described are hollow microspheres or else, alternately, other materials such as, for example, expanded perlite. It may be assumed that the term "expanded perlite" as used in DE 11 2011 103 297 T5 refers to open-cell or open-pore, riven perlites, since the published text was drafted long before the disclosure of the first production methods for closed-pore perlites.

EP 0 140 900 B1 discloses the use of a heat-insulating plate consisting of a homogeneous mixture of expanded perlite particles. While the porosity of the expanded perlite particles is not addressed in any detail, the assumption must nevertheless be that the perlites used were open-cell or open-pore, riven perlites; compare the observations above. The use of these perlites for producing moldings for the foundry industry is not described.

AT 371 092 B describes a process for producing closed microspheres of perlite. The closed microspheres produced, however, are not closed-pore microspheres of expanded perlite, but instead are hollow microspheres which have an outer shell of perlite, with a defined wall thickness, and are otherwise hollow (spherical particles).

AT 372 367 B, with the title "Refractory, exothermic, heat-insulating molding", describes the use of expanded perlite. It must be assumed that the term "expanded perlite" refers to open-cell or open-pore, riven perlites, since the published text was drafted long before the disclosure of the first production methods for closed-pore perlites.

U.S. Pat. Nos. 4,183,980 and 4,255,489 describe perlites coated with polydimethylsiloxane. These coated perlites are used as fillers for plastics in order to reduce the density of the plastic. The coated perlites disclosed are referred to as "non-porous".

EP 0 353 860 describes expanded perlites which are spherical perlites and which are not porous. It is said in the document that the particles produced can be used as fillers for numerous applications. The use of these perlites for producing moldings for the foundry industry, however, is not described.

DE 2121353A describes the use of hollow beads consisting of perlite, the surface of the hollow beads having been provided with a refractory coating. As a result of the refractory coating, the temperature stability of the hollow beads is improved, and the outer pores of the open-pore perlite are closed, thereby permitting a reduction in the amount of binder, since the binder is not taken into the pores in the perlite.

WO2006097278A1 describes a molding compound for producing moldings for the foundry industry that comprises a porous refractory substance with a continuous open pore structure. As the porous refractory substance with a continuous open pore structure, mention is made, alongside pumice, expanded shale, vermiculite, boiler sand or foamed lava, of perlite as well.

US20030032701A1 describes heat-resistant insulation materials which comprise a heat-resistant lightweight filler having a bulk density of less than 0.4 g/cm$^3$, the lightweight filler possibly comprising calcined kieselguhr, kieselguhr, expanded vermiculite, or perlite. The use of the insulation materials in the foundry industry is not described.

As a result of ongoing development in the foundry industry over recent years, the requirements imposed on the feeder materials used have increased significantly. Nowadays, for instance, the feeders are required to withstand significantly higher pressures than a few years ago, owing to the increasingly frequent use of high-pressure molding units in the foundries. Moreover, especially for use in feeders where a lower feeder part is inserted into an upper feeder part, there is a need for high strengths in conjunction with a high modulus of elasticity. Feeders of this kind are available commercially under the name "Telespeiser" from CHEMEX GmbH, Germany, and are described in more detail in EP 1184104 B1, for example.

It has emerged that the open-pore, expanded perlites produced to date have been unable to meet the heightened requirements asked of the feeder materials, and are therefore, without further modification, not suitable for use in feeders.

It was an object of the present invention, therefore, to specify a lightweight filler which, for the production of moldings, can be used as an at least partial replacement for the lightweight fillers that are presently predominantly used, with preferably an improvement in the strength and the modulus of elasticity of the shaped parts produced and with a better insulating effect on the part of the moldings. This lightweight filler should feature high availability in consistent quality.

The object posed is achieved in accordance with the invention by the use of closed-pore microspheres of expanded perlite as a filler for producing moldings for the foundry industry.

Closed-pore microspheres of expanded perlite are extraordinarily light in weight. The expansion of perlite has been known for years. However, the expansion method to date results in open-pore, riven perlites. Employed presently are innovative, closed-pore microspheres of expanded perlite, which consist of spheres having closed cavities, the cavities not being connected to one another via channels or openings. The process for producing these innovative perlites takes place in multiple stages in a downpipe-type furnace with a plurality of temperature zones. In this process, perlite sand is first sorted into different particle sizes by means of a grading profile. Each individual particle size is then exposed, in a trickle channel, to a plurality of temperature zones which feature rising temperatures, causing the perlite particles to expand.

Surprisingly it has been found, in our own investigations, that moldings for the foundry industry that comprise closed-pore microspheres of expanded perlite as a filler have particularly good properties. In particular, the moldings feature improved stability and insulating effect.

In contrast to spherical particles which are ball-like and possess only an outer shell, closed-pore microspheres of expanded perlite have a structure, in the microsphere interior, that is formed from the walls of the individual pores. As a result, moldings which comprise closed-pore microspheres of expanded perlite as a filler enjoy greater stability.

It has surprisingly emerged that closed-pore microspheres of expanded perlite have greater stability by comparison with open-pore, riven perlites, and that less binder is needed in order to produce moldings. Hence for a given quantity of binder, it is possible to obtain greater strength in the resulting molding, or a smaller quantity of binder is needed for a given or slightly increased strength.

Perlite is a rock which occurs in regions where there is volcanic activity, and is constantly regenerated because of volcanic activity. The most significant perlite resources are to be found in the Mediterranean region, North and Central America, Polynesia, New Zealand, and China. The availability of perlite is therefore high.

Preference is given to a use in accordance with the invention wherein the microspheres are obtainable by a process in which a perlite sand is expanded in a trickle channel having multistage temperature zones, the temperature zones of the trickle channel being preferably electrically heated.

In commonly employed industrial operations for the production of open-pore expanded perlites, the perlite sand is expanded in entrained flow through a flame, optionally with introduction of air, oxygen-enriched air or oxygen, or in a stream of hot gas in accordance with the countercurrent principle. It has been found that in this way it is not possible to carry out precise temperature control of the expansion process. It is therefore preferable if the perlite sand during the expansion process is not heated in entrained flow through a flame and/or not heated by a flame and/or not heated in a stream of hot gas.

It is preferred in accordance with the invention if the perlite sand, prior to treatment in the multistage temperature zone, is sorted into different particle sizes, and if only perlite sand having a defined particle size is used. The sorting into different particle sizes is accomplished preferably by means of a grading profile.

By targeted control of the perlite sand used in the expansion process, it is also possible to control the particle size of the expanded perlite.

Preference is given to a use in accordance with the invention wherein the closed-pore microspheres of expanded perlite have a particle size d50 of 180 to 300 μm, preferably of 190 to 270 μm, more preferably of 200 to 250 μm.

Preferred in accordance with the invention is a use in accordance with the invention where the closed-pore microspheres of expanded perlite (a) have a particle size d10 of 20 to 170 μm, preferably of 80 to 160 μm, more preferably of 100 to 140 μm and/or (b) have a particle size d90 of 280 to 600 μm, preferably of 290 to 450 μm, more preferably of 300 to 400 μm.

The particle sizes are determined by sieve analysis according to DIN 66165.

In our own investigations it has emerged, surprisingly, that the use of expanded perlite having the above-specified particle sizes is particularly advantageous for the production of moldings for the foundry industry.

Particularly advantageous for the purposes of the present invention is a use wherein the microspheres are closed on their surface.

Advantageous accordingly for the purposes of the present invention is a use of closed-pore microspheres of expanded perlite as a filler for producing moldings for the foundry industry, wherein the microspheres are closed on their surface.

In certain embodiments of the present invention, preferred microspheres are those which are closed on their surface, and the surface is present in the amorphous and noncrystalline state.

It has surprisingly emerged that closed-pore microspheres of expanded perlite having a closed surface, in contrast to open-pore, riven perlites, have the advantage that less binder is needed for producing moldings. As a result, less binder can be used, or for a given amount of binder the adhesion achieved is better. By virtue of the closed surface, moreover, the microspheres acquire a greater strength. It has surprisingly emerged, furthermore, that these microspheres exhibit a particularly good insulating effect.

In comparison to conventionally expanded perlite, which is open-pore, the perlites for use in accordance with the invention are distinguished by a closed-pore sphere surface and a significantly more stable internal particle structure. The closed-pore perlites have a closed foam structure with pores separated from one another, and have a virtually smooth surface.

Preferred in accordance with the invention is a use wherein the microspheres have a ratio of pure density to apparent density of greater than 1.8, preferably greater than 2.5, more preferably greater than 3.0, very preferably greater than 4.0, especially preferably greater than 5.0, the apparent density and the pure density being determined with the helium pyknometer.

The pure density denotes the density of the material part of the microspheres, without taking account of the volume of the cavities present. The pure density is determined by comminuting and grinding the material until its particles no longer contain any pores. Subsequently, the density of the comminuted and ground substance is determined by means of helium pyknometer. Helium is used because it is an inert gas and possesses an extremely small molecular diameter, and so fills all the accessible cavities in a sample.

The apparent density is the density of a porous solid based on the volume including the pore spaces. The apparent density of the microspheres is determined by helium pyknometer, without the microspheres being comminuted or ground.

A high ratio of pure density to apparent density is a measure of the closed-pore nature of porous bodies.

Likewise preferred is the use in accordance with the invention wherein the closed-pore microspheres have a porosity of more than 70%, preferably more than 75%, more preferably more than 80%.

The porosity in this case is calculated in accordance with the commonplace formula of porosity=(1−apparent density/pure density)×100%, and represents the ratio of cavity volume to total volume of a substance.

Likewise preferred is a use in accordance with the invention wherein the closed-pore microspheres, preferably closed on their surface, have an Enslin water absorption after 300 seconds of less than 2.0 ml/g, preferably of less than 1.5 ml/g, more preferably of less than 1.3 ml/g, very preferably of less than 1.2 ml/g. The procedure and evaluation here are as per DIN 18132:12-04.

The measurement of water absorption is familiar to the skilled person. The method makes use of the apparatus known as Enslin apparatus, in which a glass suction filter is connected via a tube to a graduated pipette. The pipette is mounted exactly horizontally so that it is at the same height as the glass frit. A water absorption of 1.5 ml/g therefore corresponds to a water absorption of 1.5 ml of water per 1 g of microspheres.

Particularly preferred is a use of microspheres in accordance with the invention wherein the microspheres have a particle strength of above 1.3 $N/mm^2$, preferably above 1.6 $N/mm^2$, more preferably above 1.9 $N/mm^2$, very preferably above 3 $N/mm^2$.

The particle strength was determined in a method based on DIN EN 13055-1 Annex A, method 1 (2*30 sec shaking with 0.5 mm amplitude).

Through the use of microspheres having a high particle strength it is possible—alongside further advantages—to increase the amount of microspheres in the moldings for the foundry industry (regarding preferred moldings, see below), without any drop in the strength of the moldings. As a result, the moldings are able to withstand the metallostatic pressure of the metal melt.

In one preferred embodiment of the use of closed-pore microspheres in accordance with the invention, the microspheres have a thermal conductivity of less than or equal to 0.07 W/mK, preferably less than or equal to 0.06 W/mK, more preferably of less than or equal to 0.05 W/mK.

It has emerged that closed-pore microspheres of expanded perlite for use in accordance with the invention have a significantly lower thermal conductivity than open-pore microspheres. Particularly when using the closed-pore microspheres in feeders, a significant boost can be given to the insulating effect of the feeder, because of the lower thermal conductivity.

In one inventively preferred embodiment of the use of closed-pore microspheres it is preferred for the microspheres to have a bulk density of below 500 kg/m$^3$, preferably a bulk density of below 350 kg/m$^3$, particularly below 300 kg/m$^3$.

In one inventively preferred embodiment of the use of closed-pore microspheres it is preferred for the microspheres to have a bulk density of 100 to 500 kg/m$^3$, preferably a bulk density of 200 to 350 kg/m$^3$, more preferably of 300 to 350 kg/m$^3$.

The bulk density is determined according to DIN EN ISO 60 2000-1.

At low bulk densities of less than 500 kg/m$^3$, the shaped parts and compositions produced using the microspheres for use in accordance with the invention have a particularly low density.

In a preferred use in accordance with the invention the microspheres have a sintering temperature of above 800° C., preferably of 900° C. to 1150° C., more preferably of 1050 to 1100° C.

Preference is given to a use in accordance with the invention wherein the microspheres have a moisture content of below 0.5%, preferably below 0.3%, more preferably below 0.05%.

At too high a moisture content, it is possible, during the use of the moldings produced in the foundry industry, for there to be a sudden release of steam, possibly resulting in casting defects and/or instances of damage to the moldings, or in the case of a high water content there may be explosions.

In contrast to open-pore, riven perlite, the closed-pore microspheres of expanded perlite have a very low water absorbency. In order to improve open-pore perlites in relation to water absorbency, they have hitherto been clad, using bitumen, for example. Another variant is to impregnate open-pore perlites with paraffin or to enhance them with silicone. The perlites treated in such a way, however, are little suited to use as a filler for producing moldings for the foundry industry, since in spite of the treatment the compressive strength of these products is low and with certain products, moreover, the heat resistance is not high enough. Presently it is preferred in accordance with the invention if the closed-pore microspheres are produced without additives and therefore consist entirely of perlite. Moreover, specially treated perlites are comparatively expensive, leading to an economic disadvantage when using treated perlites.

According to one preferred embodiment of the present invention, closed-pore microspheres of expanded perlite comprise $SiO_2$, $Al_2O_3$ and $K_2O$, preferably $SiO_2$, $Al_2O_3$, $K_2O$, $Na_2O$, CaO and FeO.

It is preferred in this case for the microspheres to comprise 60 to 85 percent by weight of $SiO_2$, 9 to 15 percent by weight of $Al_2O_3$, and 3 to 7 percent by weight of $K_2O$, based on the total weight of the microspheres; preferably 60 to 85 percent by weight of $SiO_2$, 9 to 15 percent by weight of $Al_2O_3$, and 3 to 7 percent by weight of $K_2O$, 1 to 6 percent by weight of $Na_2O$, 0.1 to 2 percent by weight of CaO, and 0.1 to 2 percent by weight of FeO, based on the total weight of the microspheres.

According to one preferred embodiment of the present invention, the microspheres are used in combination with expanded glass.

In that case it has emerged as being particularly advantageous, and is therefore particularly preferred, if the microspheres to be used are used in combination with expanded glasses having two different particle sizes. It is particularly preferred in this case if a first expanded glass has a particle size in the range from 0.1 to 0.3 mm and a second expanded glass has a particle size in the range from 0.25 to 0.5 mm.

Likewise preferred is a use in accordance with the invention wherein the weight ratio between microspheres to be used and the expanded glass or all the expanded glasses is 1:1 to 1:2, preferably 1:1.5 to 1:1.9.

Particularly preferred in accordance with the invention is the use of closed-pore microspheres of expanded perlite as a filler for producing moldings for the foundry industry, wherein the microspheres are closed on their surface and have a particle strength of above 1.9 N/mm$^2$, and where the microspheres are used in combination with two different expanded glasses having two different particle sizes. In this case it is particularly preferred if the first expanded glass has a particle size in the range from 0.1 to 0.3 mm and the second expanded glass has a particle size in the range from 0.25 to 0.5 mm, and the mixture of microspheres and expanded glasses is used for producing moldings by means of cold box processes.

According to one preferred embodiment of the present invention, the microspheres are used in combination with calcined rice husk ash.

Likewise preferred is the use in accordance with the invention wherein the microspheres are used in combination with expanded glass and calcined rice husk ash. It is especially preferred in this case if the fraction of calcined rice husk ash is in the range from 0.5 to 5 percent by weight, preferably in the range from 1 to 3 percent by weight, based on the total weight of microspheres, expanded glass, and calcined rice husk ash. In which case, preferably, the weight ratio between microspheres and the expanded glass or all the expanded glasses is 1:1 to 1:2, preferably 1:1.5 to 1:1.9, and the expanded glass preferably has a particle size in the range from 0.1 to 0.3 mm. This mixture of microspheres, expanded glass, and calcined rice husk ash is especially suitable for producing moldings with water glass as binder.

Preference is given to using calcined rice husk ash as described in DE 10 2011 079 692. The calcined rice husk ash is preferably produced by the method from DE 10 2011 079 692.

Likewise preferred is a use in accordance with the invention wherein the microspheres are used in combination with an organic or inorganic binder or with a mixture of organic or inorganic binder and the binder is preferably selected from the group consisting of water glass, phenol-formaldehyde resins, two-component systems comprising as reactants a polyisocyanate and a polyol component containing free hydroxyl groups (OH groups) (preferably a phenolic resin), and starch.

In the context of the two-component systems described above, free hydroxyl groups means that the hydroxyl groups are not etherified. Preferred phenolic resins which can be used as a polyol component are ortho-fused phenolic resols (also referred to as benzyl ether resins) as described for example in EP 1 057 554 B1. The term "ortho-fused phenolic resol" or benzyl ether resin, in accordance with the customary understanding of the skilled person, also encompasses compounds having the structure according to the textbook "Phenolic Resins: A Century of progress" (editor: L. Pilato, publisher: Springer, year of publication: 2010) page 477, FIG. 18.22, and also compounds which according to the VDG [German Automakers Association] R 305 data sheet on "Urethane Cold Box Process" (February 1998) are referred to as "Benzyl ether resin (ortho-phenol resol)" and/or which fall within the formula for benzyl ether polyols that is indicated in section 2.2.

Among the two-component systems which comprise as reactants a polyisocyanate and a polyol component containing free hydroxyl groups (OH groups) (preferably a phenolic resin), preference is given to cold box binders. Cold box binders are binders cured by means of tertiary amine catalysts which are supplied in mist or vapor form ("gassing").

The individual components of the two-component systems are optionally in solution in a solvent. When selecting the solvents for the polyol component and polyisocyanate component, it should be ensured that the solvents do not participate in any relevant way in the reaction between the polyisocyanate and the polyol in the presence of a catalyst, though they may well influence this reaction. As suitable solvents for the cold box binder components it is possible in particular to use a) fatty acid methyl esters, preferably rapeseed oil methyl ester, and/or b) alkyl silicates (preferably tetraethyl silicate (TEOS)), alkyl silicate oligomers, or corresponding mixtures of alkyl silicate(s) with/or alkyl silicate oligomer(s). The use of alkyl silicates, alkyl silicate oligomers, and especially tetraethyl silicate (TEOS) as solvents for cold box binders is described for example in EP 1 057 554 B1. The use of fatty acid methyl esters and especially rapeseed oil methyl ester is described in EP 0 771 599 B2.

Preferred is a use in accordance with the invention wherein the microspheres are used in combination with an organic binder, preferably a cold box binder, and wherein the cold box binder is cured by gassing with an organic amine.

It is preferred, furthermore, for the moldings for the foundry industry to be selected from the group consisting of insulating or exothermic feeders, feeder surrounds, feeder sleeves, feeder caps, filling funnels, supply elements, and heating pads.

Particularly preferred is a use in accordance with the invention for producing insulating or exothermic feeders for nonferrous casting, preferably insulating feeders for aluminum casting.

Especially preferred in this context is a use in accordance with the invention for producing moldings by means of cold box processes, preferably by the polyurethane cold box process. In the context of the present invention, cold box processes are those processes for producing feeders that use principally cold—that is, not heated or hot—molds for feeder production. The polyurethane cold box process is known in the prior art—see for example the VDG [German Automakers Association] R 305 data sheet on "Urethane Cold Box Process" (February 1998).

To produce feeders by the polyurethane cold box process (also referred to as "Urethane Cold Box Process") a composition (feeder compound) is first of all produced by mixing closed-pore microspheres of expanded perlite, for use in accordance with the invention, and optionally further constituents (e.g., further fillers as described above) with the two components of a two-component binder system comprising as reactants a polyisocyanate and a polyol component containing free hydroxyl groups (OH groups) (preferably a phenolic resin). The molding mixture is then molded. Thereafter, with brief gassing with a tertiary amine catalyst, the molded molding mixture is cured. The feeder can subsequently be removed from the mold and used.

Particularly preferred is a use in accordance with the invention of closed-pore microspheres of expanded perlite, the microspheres being closed on their surface, for producing moldings by means of cold box processes for the foundry industry for nonferrous casting, preferably for aluminum casting, where the microspheres have a particle strength of above 1.9 N/mm$^2$, in combination with expanded glasses having two different particle sizes, the first expanded glass having a particle size in the range from 0.1 to 0.3 mm and the second expanded glass having a particle size in the range from 0.25 to 0.5 mm, and the weight ratio between the first expanded glass and second expanded glass being preferably in the range from 1.5:1 to 1:1.5, preferably 1.05:1 to 1:1.05, and more preferably 1:1 and/or the weight ratio between the expanded glass or all the expanded glasses being 1:1 to 1:2, preferably 1:1.5 to 1:1.9.

A further aspect of the present invention relates to a composition for producing moldings for the foundry industry, preferably for producing feeders for the foundry industry, more preferably for producing feeders for aluminum casting, comprising closed-pore microspheres of expanded perlite (as defined above) as a filler, and a binder, the binder being selected from the group consisting of water glass, phenol-formaldehyde resins, two-component systems comprising as reactants a polyisocyanate and a polyol component containing free hydroxyl groups (OH groups) (preferably a phenolic resin), and starch. The binder is preferably an organic binder, more preferably a cold box binder.

The binder preferably comprises a two-component system comprising as reactants a polyisocyanate and a polyol component containing free hydroxyl groups (OH groups) (preferably a phenolic resin), or comprises water glass.

For the purposes of the present invention, the features described for closed-pore microspheres of expanded perlite for use in accordance with the invention are preferably also actualized in preferred compositions of the invention.

Preferred in accordance with the invention is a composition wherein the microspheres are obtainable by a process in which perlite sand is expanded in a trickle channel having multistage temperature zones, the temperature zones of the trickle channel being preferably electrically heated.

Preference is given to a composition in accordance with the invention wherein the closed-pore microspheres of expanded perlite have a particle size d50 of 180 to 300 μm, preferably of 190 to 270 μm, more preferably of 200 to 250 μm.

Preferred in accordance with the invention is a composition wherein the closed-pore microspheres of expanded perlite
 (a) have a particle size d10 of 20 to 170 μm, preferably of 80 to 160 μm, more preferably of 100 to 140 μm
 and/or
 (b) have a particle size d90 of 280 to 600 μm, preferably of 290 to 450 μm, more preferably of 300 to 450 μm.

Preferred in accordance with the invention is a composition comprising at least 30 percent by weight of the microspheres, preferably 40 percent by weight, more preferably 60 percent by weight, based on the total weight of the composition.

Likewise preferred is a composition of the invention further comprising a) an oxidizing agent, preferably potassium nitrate or sodium nitrate, and a metal oxide and metal to be oxidized
and/or
b) spherical particles which are not microspheres as defined above.

According to one preferred embodiment of the present invention, the composition of the invention comprises constituents selected from the group consisting of spheres of flyash, foamed glass, quartz sand, calcined kieselguhr, schamotte, cordierite, mullite, and mixtures thereof, preferably selected from the group consisting of expanded glass, cordierite, calcined rice husk ash, and mixtures thereof.

Particularly preferred is a composition of the invention further comprising expanded glass having two different particle sizes. In that case it is particularly preferred if a first expanded glass has a particle size in the range from 0.1 to 0.3 mm and a second expanded glass has a particle size in the range from 0.25 to 0.5 mm.

Preferred in this context is a composition of the invention wherein the weight ratio between first expanded glass and second expanded glass is in the range from 1.5:1 to 1:1.5, preferably 1.05:1 to 1:1.05, and more preferably 1:1
and/or
the weight ratio between microspheres and the expanded glass or all the expanded glasses is 1:1 to 1:2, preferably 1:1.5 to 1:1.9.

Particularly preferred in accordance with the invention is a composition comprising or consisting of closed-pore microspheres of expanded perlite, wherein the microspheres are closed on their surface and have a particle strength of above 1.9 N/mm$^2$, and where the microspheres are present in combination with expanded glasses having two different particle sizes. Here it is particularly preferred if the first expanded glass has a particle size in the range from 0.1 to 0.3 mm and the second expanded glass has a particle size in the range from 0.25 to 0.5 mm, and the mixture of microspheres and expanded glasses is used for producing moldings by means of cold box processes.

According to one preferred embodiment of the present invention, the composition of the invention further comprises constituents selected from the group consisting of spheres of flyash, foamed glass, quartz sand, calcined kieselguhr, schamotte, cordierite, and mullite.

A further aspect of the present invention relates to a molding for the foundry industry, produced using closed-pore microspheres of expanded perlite as defined earlier on above or using a composition of the invention.

A further aspect in connection with the present invention relates to a process for producing a molding for the foundry industry, having the following steps:
(a) producing or providing closed-pore microspheres of expanded perlite as defined above,
(b) mixing the closed-pore microspheres of expanded perlite, produced or provided in step (a), with a binder and also optionally further constituents to give a composition, and
(c) molding and curing the composition from step (b) to give a molding
or
(i) producing or providing a composition of the invention, and
(ii) molding and curing the composition from step (i) to give a molding.

The optional further constituents stated here encompass further fillers, preferably selected from the group consisting of spheres of flyash, foamed glass, quartz sand, calcined kieselguhr, schamotte, cordierite, mullite, and mixtures thereof, preferably selected from the group consisting of expanded glass, cordierite, calcined rice husk ash, and mixtures thereof,
an oxidizing agent, preferably potassium nitrate or sodium nitrate, and optionally a metal oxide and metal (preferably selected from the group consisting of aluminum, magnesium, calcium, and silicon) to be oxidized by the oxidizing agent.

Particularly preferred here is a process of the invention where an organic or inorganic binder or a mixture of organic and inorganic binder is used in step (b) and the binder is preferably selected from the group consisting of water glass, phenol-formaldehyde resins, two-component systems which comprise as reactants a polyisocyanate and a polyol component containing free hydroxyl groups (OH groups) (preferably a phenolic resin), and starch.

Especially preferred is a process of the invention wherein an organic binder, preferably a cold box binder, is used in step (b) or (i) and wherein the curing in step (c) or (ii) takes place according to a cold box process by gassing with an organic amine.

In the context of the present invention, two or more of the aspects identified above as being preferred are preferably actualized at the same time; preferred more particularly are the combinations of such aspects and of the corresponding features that arise from the appended claims.

The present invention is elucidated in more detail below by means of examples.

EXAMPLES

Measurement Methods:
1. Particle size determination:
The particle sizes of closed-pore microspheres are determined by sieving in accordance with DIN 66165-2 (4.1987), employing method F therein (mechanical sieving with agitated individual sieve or sieve set in gaseous fluid at rest). A vibrational sieving machine of type RETSCH AS 200 control is used; the amplitude is set at level 1.8; there is no interval sieving at 10 seconds; the sieving time is 5 minutes.
2. Determination of bulk density:
The bulk density was determined according to DIN EN ISO 60 2000-1.
3. Determination of chemical composition and morphology:
The morphology of the samples was carried out by means of an SEM from Jeol, JSM 6510. The chemical composition was carried out by means of an EDX analysis using an EDX from Oxford INCA.
To determine the morphology, furthermore, a VisiScope ZTL 350 light microscope with Visicam 3.0 camera was employed.

4. Particle strength:
The particle strength was determined in a method based on DIN EN 13055-1 Annex A, method 1 (2*30 sec shaking with 0.5 mm amplitude).

Inventive Example 1 and Comparative Example 1

Using the constituents specified in the table below, test bars were then produced by the cold box process (catalyst N,N-dimethylpropylamine) and their flexural strength was determined in a method based on VDG standard P 73, method A (BOSCH Profi 67 mixer used, processing at ambient temperature and ambient humidity, production by ramming, test values captured after 1 h and after 24 h, triplicate determination in each case) using the PFG strength testing apparatus with low-pressure manometer N (with motor drive).

In inventive example 1, closed-pore microspheres of expanded perlite having a particle size d50 of 0.25 mm (d10=0.14 mm, d90=0.40 mm) and a bulk density of 300 g/l are used, with a particle strength of 2.0 N/mm².

|  | Inventive example 1 | Comparative example 1 |
| --- | --- | --- |
| Expanded glass 0.1-0.3 mm | 30.00 | 30.00 |
| Expanded glass 0.25-0.50 mm | 30.00 | 30.00 |
| Closed-pore microspheres of expanded perlite | 40.00 | — |
| Cenolite P55120 (open-pore, expanded perlite) | — | 40.00 |
| Polyisocyanate component (Aktivator 6324, Hüttenes-Albertus) | 8.00 | 8.00 |
| Benzyl ether resin component (Gasharz 7241, Hüttenes-Albertus) | 8.00 | 8.00 |
| Mass of cylinder [g] | 41.5 | 39 |
| Gas permeability | 95 | 105 |
| Flexural strength 1 h [N/cm²] | 260 | 120 |
|  | 270 | 120 |
|  | 270 | 110 |
| Mean flexural strength 1 h [N/cm²] | 267 | 117 |
| Flexural strength 24 h [N/cm²] | 280 | 140 |
|  | 270 | 120 |
|  | 270 | 130 |
| Mean flexural strength 24 h [N/cm²] | 273 | 130 |

The mixture from inventive example 1 is suitable for use in feeders. The mixture from comparative example 1 is not suitable for use in feeders, owing to inadequate strengths.

Inventive Example 2 and Comparative Examples 2 and 3

Using the constituents indicated in the table below, feeder caps closed at the bottom were produced from each of the compositions by the cold box process (catalyst N,N-dimethylpropylamine), with the feeder caps produced from the different compositions having identical geometries.

The feeder caps produced are molded centrally into a loose quartz sand bed and provided in each case centrally with a coated Pt/Rh.Pt thermocouple. The feeder caps were subsequently filled with an aluminum melt (Al 226), the bath temperature of the aluminum melt being 800° C. After the aluminum melt has been poured into the feeder caps, the temperature profile is recorded.

In inventive example 2, closed-pore microspheres of expanded perlite having a particle size d50 of 0.25 mm (d10=0.14 mm, d90=0.40 mm) and a bulk density of 300 g/l are used, with a particle strength of 2.0 N/mm².

|  | Inventive example 2 | Comparative example 2 | Comparative example 3 |
| --- | --- | --- | --- |
| Spheres | — | 100.0 | 18.0 |
| Expanded glass 0.25-0.5 mm | 30.0 | — | 30.0 |
| Expanded glass 0.1-0.3 mm | 30.0 | — | 52.0 |
| Closed-pore microspheres of expanded perlite | 40.0 | — | — |
| Total dry mixture [% by mass] | 100.0 | 100.0 | 100.0 |
| Polyisocyanate component (Aktivator 6324, Hüttenes-Albertus) | 8.0 | 8.0 | 7.5 |
| Benzyl ether resin component (Gasharz 7241, Hüttenes-Albertus) | 8.0 | 8.0 | 7.5 |

Figure 1:
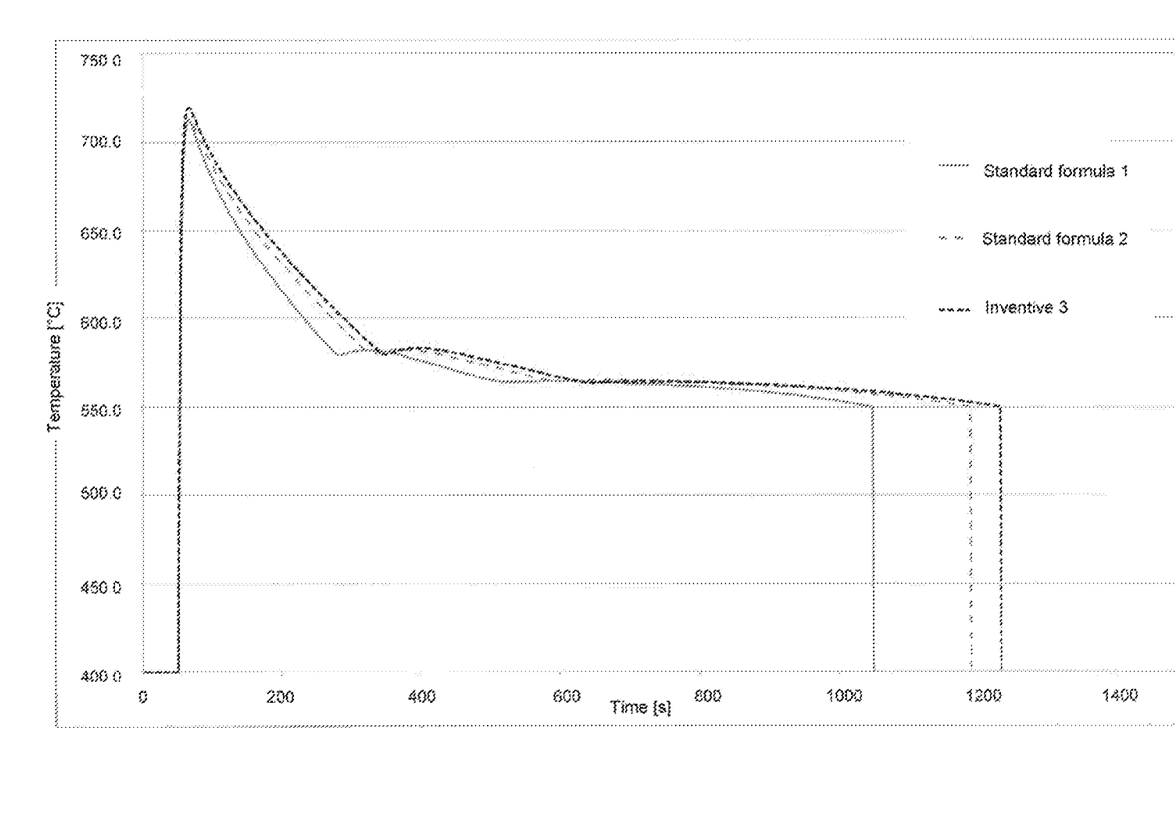
FIG. 1 shows a temperature/time plot of inventive example 2 (identified as inventive 3; bold dashed line) and of comparative examples 2 (identified as standard formula 1; continuous line) and 3 (identified as standard formula 2; gray dashed line). It shows that the temperature of the aluminum melt is maintained for longer in the closed feeder produced, in other words that the aluminum melt cools more slowly.

FIG. 1 shows a temperature/time plot of example 2 (identified as inventive 3) and of comparative examples 2 (identified as standard formula 1) and 3 (identified as standard formula 2). Each casting took place at identical temperatures. It can be seen that the inventive composition from inventive example 2 exhibits a better insulating effect than the compositions from comparative examples 2 and 3.

Example 3

Determination of the Enslin Water Absorption of Perlites

The water absorption of open-pore, expanded perlite (Cenolite P55120) and of closed-pore microspheres of expanded perlite with a closed surface was determined by the method of Enslin. The determination was made under 0.5 g of the respective bulk product, using an Enslin apparatus. The results are summarized in the table below.

| Time elapsed [s] | Water absorption [ml/g] for closed-pore microspheres of expanded perlite | Water absorption [ml/g] for open-pore, expanded perlite (Cenolite P55120) |
| --- | --- | --- |
| 30 | 1.1 | 1.6 |
| 40 | 1.1 | 2.0 |
| 60 | 1.1 | 2.1 |
| 120 | 1.1 | 2.1 |
| 180 | 1.1 | 2.1 |
| 300 | 1.1 | 2.1 |

The measurement results show clearly that the water absorption of closed-pore microspheres of expanded perlite is only around half as great as the water absorption of the open-pore, expanded perlite. As expected, substantially more water is able to penetrate to the open pores of the open-pore, expanded perlite than in the case of closed-pore microspheres of expanded perlite.

The invention claimed is:

1. A molding for the foundry industry, produced using
closed-pore microspheres of expanded perlite, having a closed foam structure with pores separated from one another, and wherein the microspheres are closed on their surface;

wherein the microspheres have a particle size d50 of 200 to 250 µm;

expanded glass;

wherein a weight ratio of perlite to expanded glass ranges from 1:1 to 1:2;

and an organic or inorganic binder or a mixture of organic and inorganic binder, wherein the binder is selected from the group consisting of water glass, phenol-formaldehyde resins, two-component systems comprising as reactants a polyisocyanate and a polyol component containing free hydroxyl groups (OH groups), and starch wherein the closed-pore microspheres of expanded perlite have a bulk density from 200 to 500 kg/m$^3$.

2. The molding as claimed in claim 1, wherein the microspheres are obtainable by a process in which a perlite sand is expanded in a trickle channel having multistage temperature zones.

3. The molding as claimed in claim 1, wherein the microspheres have a ratio of pure density to apparent density of greater than 1.8, the apparent density and the pure density being determined with the helium pyknometer.

4. The molding as claimed in claim 1, wherein the microspheres have a particle strength of above 1.3 N/mm$^2$.

5. The molding as claimed in claim 1, wherein the molding further comprises additional constituents selected from the group consisting of spheres of flyash, foamed glass, quartz sand, calcined kieselguhr, schamotte, cordierite, mullite, and mixtures thereof.

6. The molding as claimed in claim 1, wherein the molding is selected from the group consisting of insulating or exothermic feeders, feeder surrounds, feeder sleeves, feeder caps, filling funnels, supply elements, and heating pads.

7. The molding as claimed in claim 1, for producing insulating or exothermic feeders for nonferrous casting.

8. The molding as claimed in claim 1, wherein the expanded glass comprises a first expanded glass and a second expanded glass, wherein a weight ratio between the first expanded glass and the second expanded glass ranges from 1:1 to 1:2.

9. The molding as claimed in claim 8, wherein the first expanded glass has a particle size between 0.1 to 0.3 mm and the second expanded glass has a particle size between 0.25 to 0.5 mm.

10. The molding as claimed in claim 1, wherein the closed-pore microspheres of expanded perlite have a bulk density of 200 to 350 kg/m$^3$.

* * * * *